No. 890,968. PATENTED JUNE 16, 1908.
J., M. L. & J. A. DAVEY.
PROCESS OF TREATING AND DRESSING A BRUISE OR WOUND IN THE TRUNK OR LIVE BRANCH OF A LIVE TREE.
APPLICATION FILED JAN. 22, 1908.
2 SHEETS—SHEET 1.
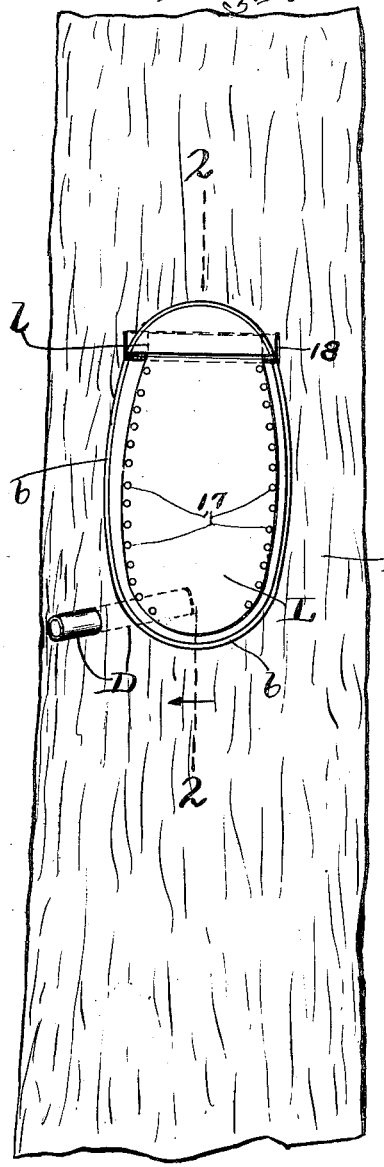
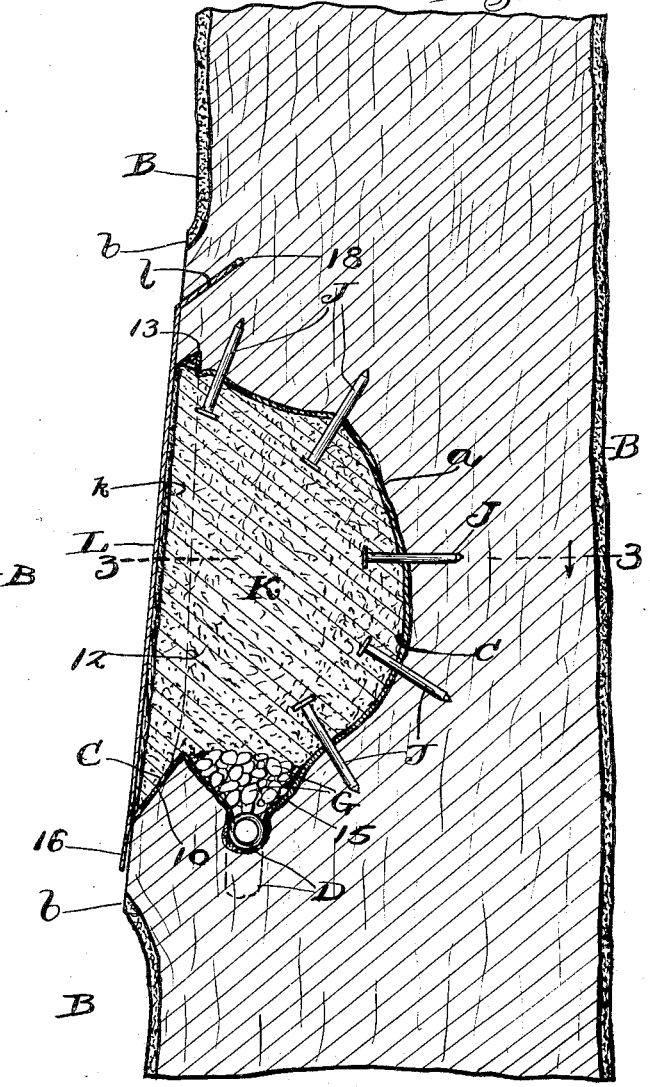
Witnesses:
Inventors

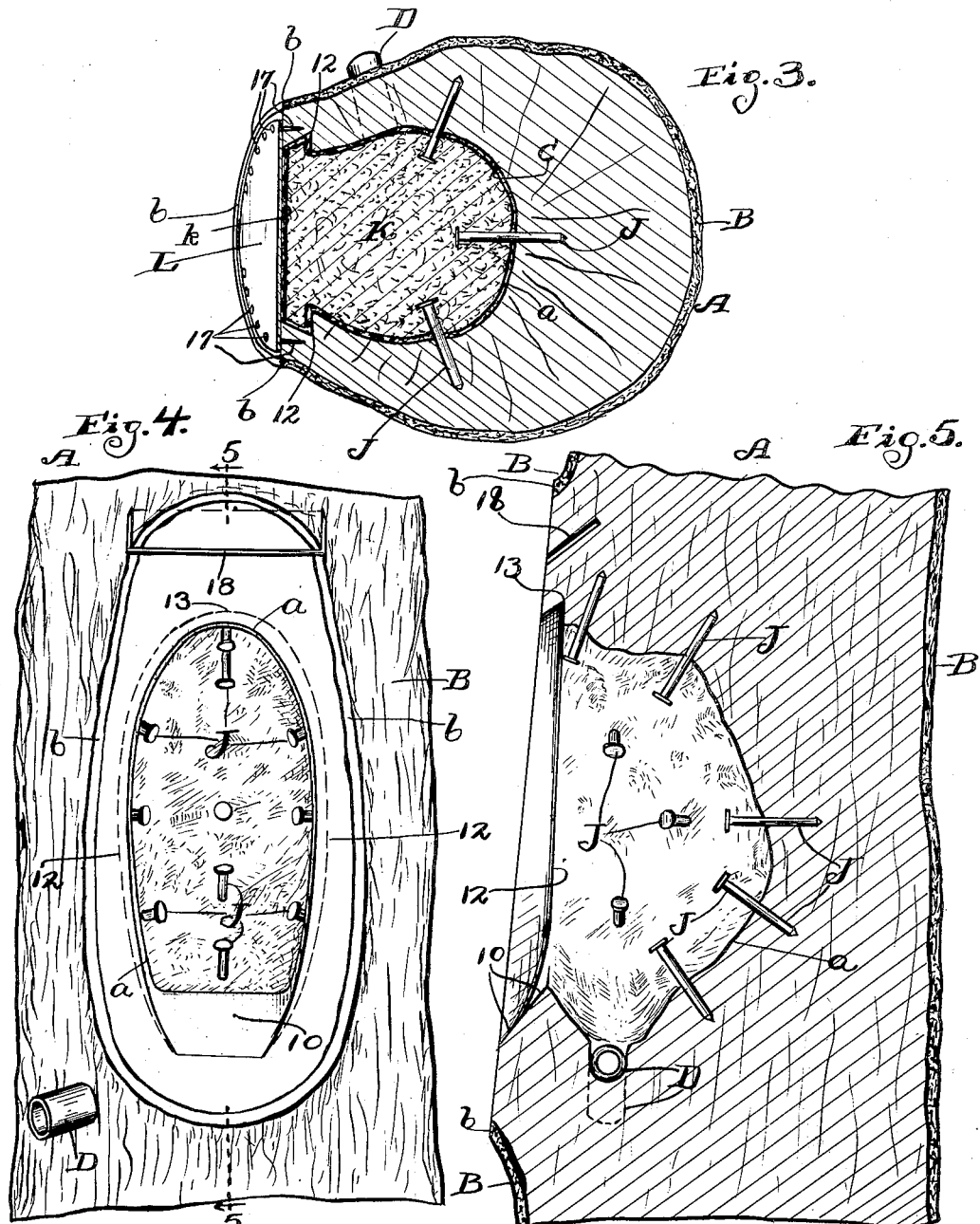

UNITED STATES PATENT OFFICE.

JOHN DAVEY, MARTIN L. DAVEY, AND JAMES A. DAVEY, OF KENT, OHIO.

PROCESS OF TREATING AND DRESSING A BRUISE OR WOUND IN THE TRUNK OR LIVE BRANCH OF A LIVE TREE.

No. 890,968.   Specification of Letters Patent.   Patented June 16, 1908.

Application filed January 22, 1908. Serial No. 412,035.

*To all whom it may concern:*

Be it known that we, JOHN DAVEY, MARTIN L. DAVEY, and JAMES A. DAVEY, all citizens of the United States of America, residing at Kent, in the county of Portage and State of Ohio, have invented a certain new and useful Improved Process of Treating and Dressing a Bruise or Wound in the Trunk or Live Branch of a Live Tree; and we do hereby declare the following to be a full, clear, and exact description of the invention, such as will enable others skilled in the art to which it pertains to make and use the same.

This invention relates to an improved process of treating and dressing a bruise or wound or any decayed or unsound spot in the trunk or live branch of a live tree.

The primary object of this invention is to remove all decayed and unsound wood and foreign matter from the wounded or unsound portion of the trunk or branch, and so dress the cavity formed by removing the decayed or unsound wood and foreign matter that the wound will be readily healable by nature and further decay or harm to the tree prevented.

With this object in view, and to the end of realizing other advantages hereinafter appearing, our improved process consists in the steps hereinafter described and pointed out in the claims.

The accompanying drawings illustrate the treatment and dressing of a bruise or wound in the trunk or live branch of a live tree by our improved process.

In the said drawings, Figure 1 is a side view of a portion of the trunk or live branch of a live tree, and shows the manner of shielding the filling of a cavity formed in the trunk or branch by the removal of decayed and unsound wood and foreign matter from the trunk or branch. Fig. 2 is a vertical section on line 2—2, Fig. 1, looking in the direction indicated by the arrow. Fig. 3 is a horizontal transverse section on line 3—3, Fig. 2, looking downwardly. Fig. 4 is a side view illustrating the manner of forming and preparing the cavity preparatory to filling the cavity. Fig. 5 is a vertical section on line 5—5, Fig. 4, looking in the direction indicated by the arrow. Figs. 2, 3, 4 and 5 are drawn on a larger scale than Fig. 1.

Referring to the drawings, A indicates the trunk or live branch of a live tree which is to be treated by our improved process, and $a$ represents a cavity which is formed in one side of the trunk or branch by removing all decayed or unsound wood and foreign matter from the bruised, diseased or injured spot in the said side of the trunk or branch. B represents the bark of the tree, which bark is cut away or trimmed, as at $b$, around and a short distance from the outer end of the cavity $a$.

The first step of our improved process consists in forming the cavity $a$ large enough and removing all decayed or unsound wood and foreign matter from the diseased or unsound portion of the trunk or branch by the formation of the said cavity. The bottom of the cavity is cut away at the outer end of the cavity so as to slope downwardly and outwardly, as at 10. (See Figs. 2, 4 and 5). Each side wall of the cavity is provided at the outer end of the cavity with a recess 12 which extends upwardly from the downwardly and outwardly sloping portion 10 of the bottom of the cavity at a point below the upper end of the said sloping portion to the top wall of the cavity and there connects with the adjacent end of a recess 13 formed at the outer end of the cavity in and transversely of the said top wall. Obviously the recesses 12 and 13 form a channel which extends upwardly from the sloping portion 10 of the bottom at one side of the cavity to the top of the cavity, thence across the top of the cavity and downwardly at the opposite side of the cavity to the said sloping portion of the bottom, and the channel thus provided constitutes a lateral and upward enlargement of the cavity at the outer end of the cavity. It will be observed therefore that the cavity formed by the removal of the decayed or unsound wood and foreign matter from the trunk or branch is enlarged laterally in opposite directions and upwardly, and that the lateral enlargements 12 of the cavity terminate at their lower ends at the sloping portion 10 of the bottom of the cavity a suitable distance below the upper end of the said sloping portion of the bottom, as shown very clearly in Figs. 4 and 5.

In the bottom of the cavity, between the sloping portion 10 of the bottom and the rear wall of the cavity, is formed a pocket 15 for receiving gravel G or similar material (see Fig. 2), and a drain-pipe D is inserted in the trunk or branch at the bottom of the mass of gravel or material G; which pipe extends downwardly and outwardly from the bottom of the pocket D to the exterior of the trunk or branch.

Upon the formation of the cavity and its lateral and upward enlargements at its outer end all the walls of the cavity, including the walls of the said enlargements and the sloping portion 10 of the bottom, are covered (see Figs. 2 and 3) by a layer or coat C of molten tar or other bituminous paint or any composition or material which is waterproof and will seal the pores in and readily adhere to the wood of the trunk or branch and will also form a surface to which Portland cement or cementitious material will readily adhere. Before the said waterproof coating or covering has become dry and hard and of course after applying the nails or like devices J hereinafter referred to the cavity is plugged or filled with a cementitious compound or material K which is impervious to moisture and which will readily adhere to the said waterproof covering or coating. We prefer to cover the walls of the cavity with molten tar because the tar will readily adhere to the wood of the trunk or branch and will form a desirable surface to which the cementitious filling K will easily adhere and form a fluid-tight joint between the filling K and the said walls, and the nails or like devices J driven into the walls of the cavity will, when the cementitious filling becomes set and hardened, assist in supporting the filling and in retaining the filling in place within the cavity. It will be observed also that the portions of the filling K which engage the lateral and upward enlargements of the cavity operate to retain the filling in place within the cavity.

Preferably the nails or similar devices J are partly driven into the walls of the cavity at suitably spaced points through the waterproof coating or layer C.

The object of coating or covering the walls of the cavity with tar or similar waterproof material is to prevent moisture entering the wood from within the cavity and to destroy any insects which may still be housed within the said walls and to properly attach the cementitious filling to the said walls.

The object of filling the cavity with cementitious material is to protect the said waterproof coating or covering and to exclude rain, sleet, snow, insects and other foreign matter and to reinforce the trunk or branch at the wounded spot.

The object of enlarging the cavity laterally in opposite directions and upwardly at the outer end of the cavity is to prevent any rain, water or moisture which may have found access into the outer end of the cavity externally of the cementitious filling through any possible imperfections in the joint between the filling K and the waterproof coating C or in the said coating, from passing inwardly beyond the said enlargements of the cavity, and any water or moisture obtaining ingress into the said enlargements of the cavity from any cause and gravitating adown the said enlargements onto the sloping portion 10 of the bottom of the cavity will gravitate adown the said sloping portion of the bottom to the exterior of the trunk or branch of the tree.

The cementitious filling K is shielded from the weather at the outer end of the cavity by a metal shield L which is larger in dimensions than the outer end of the cavity so as to completely cover the cementitious filling and overlap the wood of the trunk or branch all round the said end of the cavity, as shown in Figs. 1, 2 and 3. The shield L snugly fits the wood of the trunk or branch all round the outer end of the cavity, except at the lower end of the sloping portion 10 of the bottom of the cavity where the shield is loose relative to the said bottom, as at 16, (see Fig. 2) to avoid any obstruction to the escape from the said portion of the said bottom of any water or moisture gravitating adown the said portion of the said bottom. The shield L is preferably tacked, as at 17, at the sides of the cavity a to the wood of the trunk or branch of the tree. The shield L prevents rain or water from being blown or driven into any crack or cracks which may appear in the cementitious filling.

The shield L is provided a short distance above the top of the cavity with an upwardly and inwardly projecting flange l which snugly fits within a correspondingly arranged slot 18 made in the wood of the trunk or branch of the tree, and the walls of the said slot are preferably painted, and any portions of the said slot which are not occupied by the flange l are preferably plugged or filled with tar or other waterproof material.

Preferably the cementitious filling K has its surface which faces the shield L at the outer end of the cavity coated or covered with molten tar or other bituminous paint or waterproof material k to insure the exclusion as much as possible of rain or moisture from the said surface, and the said waterproof coating k is of course applied preparatory to the application of the shield L.

We would here remark that any water or moisture which may find access to the gravel or loose material in the pocket 15 in the bottom of the cavity is drained off through the pipe D.

A trunk or branch of a tree treated at any unsound portion thereof by our improved process will rapidly improve in health and growth, and new wood and bark will grow to and over the outer side of the shield L.

All exposed exterior surfaces of wood at the top, bottom and sides of the cavity are painted to render them impervious to moisture. Painting or otherwise treating exterior surfaces of the wood exposed in the trimming or treatment of trees, to render the said surfaces impervious to moisture, is a not uncommon practice and does not constitute a feature of our invention which essentially pertains to the formation and dressing of a cavity formed in a live trunk or branch by the removal of all decayed or unsound wood or foreign matter from the wounded or unsound portion of the trunk or branch.

What we claim is:—

1. The herein described process of treating and dressing a bruise or wound in the trunk or live branch of a live tree, comprising the formation of a cavity in the trunk or branch by the removal of all decayed or unsound and foreign matter at the unsound spot in the trunk or branch; then coating or covering the said walls of the cavity with molten tar, and before the tar hardens filling the cavity with cementitious material which will adhere to the tar.

2. The herein described process of treating and dressing a bruise or wound in the trunk or live branch of a live tree, comprising the formation of a cavity in the trunk or branch by the removal of all decayed or unsound and foreign matter at the wounded spot in the trunk or branch; then coating or covering the said walls with a layer of waterproof material and partially driving nails through the said layer and into the walls of the cavity at suitably spaced points, and then filling the cavity with cementitious material.

3. The herein disclosed process of treating and dressing a bruise or wound in the trunk or live branch of a live tree, consisting in the formation of a cavity in the trunk or branch by removing all decayed or unsound and foreign matter at the wounded spot in the trunk or branch and recessing the side walls and top wall of the cavity at the outer end of the cavity to form a channel extending from the bottom of the cavity at one side of the cavity to the top wall of the cavity, thence across the said top wall to the other side of the cavity, and thence downwardly to the bottom of the cavity, and then filling the cavity.

4. The herein disclosed process of treating and dressing a bruise or wound in the trunk or live branch of a live tree, consisting in the formation of a cavity in the trunk or branch by removing all decayed or unsound and foreign matter at the wounded spot in the trunk or branch and providing the side walls of the cavity at the outer end of the cavity with recesses extending from the bottom of the cavity upwardly to the top of the cavity, and then filling the cavity.

5. The herein disclosed process of treating and dressing a bruise or wound in the trunk or live branch of a live tree, consisting in the formation of a cavity in the trunk or branch by removing all decayed or unsound and foreign matter at the wounded spot in the trunk or branch and providing the side walls of the cavity at the outer end of the cavity with recesses extending from the bottom to the top of the cavity; then filling the cavity, and then shielding the filling at the outer end of the cavity.

6. The herein described process of treating and dressing a bruise or wound in the trunk or live branch of a live tree, consisting in the formation of a cavity in the trunk or branch by removing all decayed or unsound and foreign matter at the wounded spot in the trunk or branch and cutting away the bottom of the cavity at the outer end of the cavity to form a downwardly and outwardly sloping surface and providing the side walls of the cavity with recesses extending from the aforesaid surface upwardly a suitable distance, and then filling the cavity.

7. The herein disclosed process of treating and dressing a bruise or wound in the trunk or live branch of a live tree, consisting in the formation of a cavity in the trunk or branch by removing all decayed or unsound and foreign matter at the wounded spot in the trunk or branch and cutting away the bottom of the cavity at the outer end of the cavity to form a downwardly and outwardly sloping surface and recessing the side walls and top wall of the cavity at the outer end of the cavity to form a channel extending from the aforesaid surface at one side of the cavity to the top wall of the cavity, thence across the said top wall to the other side of the cavity, and thence downwardly to the aforesaid surface, and then filling the cavity.

Signed by us at Cleveland, Ohio, this 2nd day of January, 1908.

JOHN DAVEY.
MARTIN L. DAVEY.
JAMES A. DAVEY.

Witnesses:
C. H. DORER,
VICTOR C. LYNCH.